(12) United States Patent
Dhanapal et al.

(10) Patent No.: US 11,331,841 B2
(45) Date of Patent: May 17, 2022

(54) SIZER FOR AN EXTRUSION MACHINE WITH IMPROVED COOLING AND VACUUM CHANNELS

(71) Applicant: Engineered Profiles LLC, Columbus, OH (US)

(72) Inventors: Vickram Dhanapal, Delaware, OH (US); Gary Oney, Londonderry, OH (US); Roger May, Lancaster, OH (US); Troy Kimmes, Johnstown, OH (US)

(73) Assignee: Engineered Profiles LLC, Columbus, OH (US)

( * ) Notice: Subject to any disclaimer, the term of this patent is extended or adjusted under 35 U.S.C. 154(b) by 132 days.

(21) Appl. No.: 16/565,982

(22) Filed: Sep. 10, 2019

(65) Prior Publication Data

US 2020/0079002 A1 Mar. 12, 2020

Related U.S. Application Data

(60) Provisional application No. 62/729,789, filed on Sep. 11, 2018.

(51) Int. Cl.
*B29C 48/90* (2019.01)
*B29C 48/09* (2019.01)
*B29C 48/88* (2019.01)
*B29C 48/12* (2019.01)

(52) U.S. Cl.
CPC .......... *B29C 48/903* (2019.02); *B29C 48/09* (2019.02); *B29C 48/904* (2019.02); *B29C 48/913* (2019.02); *B29C 48/916* (2019.02); *B29C 48/12* (2019.02)

(58) Field of Classification Search
CPC ....... B29C 48/09; B29C 48/12; B29C 48/256; B29C 48/503; B29C 48/903; B29C 48/904; B29C 48/908; B29C 48/913; B29C 48/916
See application file for complete search history.

(56) References Cited

U.S. PATENT DOCUMENTS

| 4,401,424 | A | 8/1983 | De Zen |
| 5,288,218 | A | 2/1994 | Melkonian |
| 6,200,119 | B1 | 3/2001 | Pelto et al. |
| 6,394,782 | B1 * | 5/2002 | Grassi ............... B29C 48/09 425/384 |

(Continued)

OTHER PUBLICATIONS themoldingblog.com, site visited Jun. 4, 2018, http://www.themoldingblog.com/2017/02/17/sabic-seeks-patent-for-conformal-cooling-via-additive-manufacturing/.

(Continued)

*Primary Examiner* — Xiao S Zhao
*Assistant Examiner* — Joseph S Leyson
(74) *Attorney, Agent, or Firm* — Standley Law Group LLP; Jeffrey Standley; Jeffrey Norris (57) ABSTRACT

A sizer for cooling an extrudate includes a core and a housing. The core includes an extrusion channel which accommodates the extrudate, a core cooling channel, and a core vacuum channel in fluid communication with said extrusion channel. The housing includes a housing cooling channel, a housing vacuum channel, a cooling intake, and a cooling exhaust. The housing cooling and vacuum channels having curved segments. The cooling intake and exhaust being in fluid communication with said housing cooling channel.

23 Claims, 6 Drawing Sheets

(56) References Cited

U.S. PATENT DOCUMENTS

| | | | |
|---|---|---|---|
| 8,517,248 B2 | 8/2013 | Zaffino | |
| 2001/0018078 A1* | 8/2001 | Kossl | B29C 48/12 |
| | | | 425/71 |
| 2001/0043963 A1 | 11/2001 | Zhang et al. | |
| 2014/0291886 A1 | 10/2014 | Mark et al. | |
| 2017/0043518 A1 | 2/2017 | Narayanaswamy | |
| 2017/0226355 A1* | 8/2017 | Torfs | B41J 2/01 |
| 2017/0328651 A1* | 11/2017 | Rozga | H05B 3/42 |

OTHER PUBLICATIONS

Hölker, R. et al., Controlling Heat Balance in a Hot Aluminum Extrusion by Additive Manufactured Extrusion Dies with Conformal Cooling Channels, International Journal of Precision Engineering and Manufacturing, Aug. 8, 2013, pp. 1487-1493, vol. 14, No. 8.

Marques, S. et al., Design of Conformal Cooling for Plastic Injection Moulding by Heat Transfer Simulation, Polimeros, 2015, pp. 564-574.

\* cited by examiner

SIZER FOR AN EXTRUSION MACHINE WITH IMPROVED COOLING AND VACUUM CHANNELS

CROSS-REFERENCE TO RELATED APPLICATIONS

This application claims the benefit of U.S. Provisional Application No. 62/729,789 filed Sep. 11, 2018, the disclosures of which are hereby incorporated by reference as if fully restated herein.

TECHNICAL FIELD

Exemplary embodiments relate generally to sizers for creating extrusion profiles.

BACKGROUND AND SUMMARY OF THE INVENTION

Making a profile through extrusion requires two key components: a die to shape the molten material into the desired shape; and sizers to maintain the shape as the material cools to create a stable end product. Depending on the shape of the desired extrudate and the level of temperature reduction required, multiple sizers may be provided in succession to achieve adequate cooling. Typically, these sizers are made of two separately formed pieces that are joined together and define a hollow extrusion channel for the extrudate to flow through, although a single piece may be used as well.

Within the sizer components, vacuum channels may be provided above and below the extrudate to maintain the extrudate's shape as it passes through the extrusion channel. Without the vacuum channels, gravity might cause undesired deformations. However, these vacuum channels create obstacles for cooling channels, which may be required to adequately cool the extrudate. As water flows through the cooling channels, heat may be conductively removed from the extrudate. Ideally, the cooling channels conform to the shape of the extrudate and run along the length of the extrudate channel to maximize cooling efficiency. As both the vacuum and cooling channels require interaction with the extrusion channel, positioning both types of channels to in a way which provides sufficient proximity and interaction with the extrudate to achieve both adequate cooling and adequate distribution of material is spatially challenging.

The single or multi-piece sizer may begin as a solid piece of metal with the appropriate shaped channels (extrusion, cooling, and vacuum) being removed from the solid piece(s) by subtractive manufacturing. In the case of a multi-piece construction, material may be removed from the top and/or bottom pieces which when joined may form the various channels.

Conventional, subtractive manufacturing techniques for creating cooling and vacuum channels require drilling into the sizer to create the channels. This approach provides certain drawbacks. For example, channels manufactured by such techniques cannot contain non-linear pathways (e.g., curves) to avoid other channels. Where the channels must change direction, they are limited to sharply angled intersections, typically at 90-degrees. These intersections do not provide for efficient flow of cooling fluids or transmission of vacuum forces. Furthermore, each segment of the channel to be drilled out requires a separate entry and exit point. Where more than one segment is required, the additional entry and exit points must subsequently be plugged. In order to adequately form cooling and vacuum pathways around the extrusion channel, oftentimes the cooling and vacuum channels are temporarily intersected to create such channels, and must later be filled to create separation between the cooling and vacuum pathways. Further still, such drilling generally results in round channels, which are not always desirable.

There exists a need in the art for sizers with improved cooling and vacuum channels. The present disclosures provide sizers with improved cooling and vacuum channels.

To improve the cooling and vacuum channels, non-linear pathways may be created. These non-linear pathways may permit cooling and vacuum channels to be provided without intersecting one another. These non-linear pathways may also maximize the efficiency of cooling flow and the transmission of vacuum forces. For example, without limitation, non-linear cooling channels may be configured to induce turbulence in the cooling fluid and/or may permit the cooling channels or vacuum channels to more closely conform to the extrusion channel. As a further example, without limitation, smooth shaped curves and a lack of sharply angled intersections may provide for more even distribution of vacuum forces.

In exemplary embodiments, the sizer may be formed from a housing and a core. The core may comprise an upper portion and a lower portion, which may be formed separately, though such is not required. The core may comprise any number of pieces. The core may be formed using subtractive manufacturing techniques, such as conventional drilling. In such embodiments, the cooling and vacuum channels may be linear, though such is not required. The core may be comprised of a thermally conductive material, such as metal. The core may comprise an extrusion channel as well as one or more cooling and vacuum channels.

The housing may comprise an upper portion and a lower portion, which may be formed separately, though such is not required. The housing may comprise any number of pieces. The housing may be comprised of a polymer or other material. The housing may be created by additive manufacturing techniques, such as but not limited to 3-D printing. The housing may comprise cooling and vacuum channels. The cooling and vacuum channels may comprise one or more non-linear segments, such as but not limited to, smooth curves, though such is not required. The cooling and vacuum channels of the housing may be configured to provide fluid communication with the cooling and vacuum channels of the core when the housing is joined to the core. The housing may further comprise one or more cooling inlets and exits for the ingestion and expulsion of cooling fluid. The housing may further comprise one or more vacuum inlets and exits for the ingestion and expulsion of suction forces. In exemplary embodiments, the cooling and vacuum channels may be configured to extend through multiple sizers. In such cases, inlets and exits for cooling fluids and suction may not be required on particular sizers.

In exemplary embodiments, the core may be created through additive manufacturing techniques, such as but not limited to 3-D printing. In such embodiments, the cooling and vacuum channels may comprise one or more non-linear segments, such as but not limited to, smooth curves, though such is not required. Regardless, the cooling and vacuum channels of the housing may be provided to align with the cooling and vacuum channels of the core.

In addition, or alternatively, the cooling and vacuum channels may be formed into various geometric cross sections. Such cross sections may be designed to induce or reduce turbulence of cooling fluid flows or to impact particular suction forces, for example without limitation.

In some exemplary embodiments, the entire housing and core may be created as a single piece by additive manufacturing. The cooling and vacuum channels of the housing may be provided in one or more standard sizes. This may enable only a new core to be created with the associated housing and vacuum channels instead of creating an entirely new sizer for each individual profile extrusion.

The sizer may allow for less material to be used for the core of the sizer, providing faster and cheaper manufacturing turnover. Additionally, the sizer may permit the creation of improved cooling and vacuum channels in more sizer-space than previously capable. The cooling and vacuum channels may be restricted only by the volume of the sizer. Vortexes or other shapes creating still or turbulent flows may be provided as needed to cool the profile.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
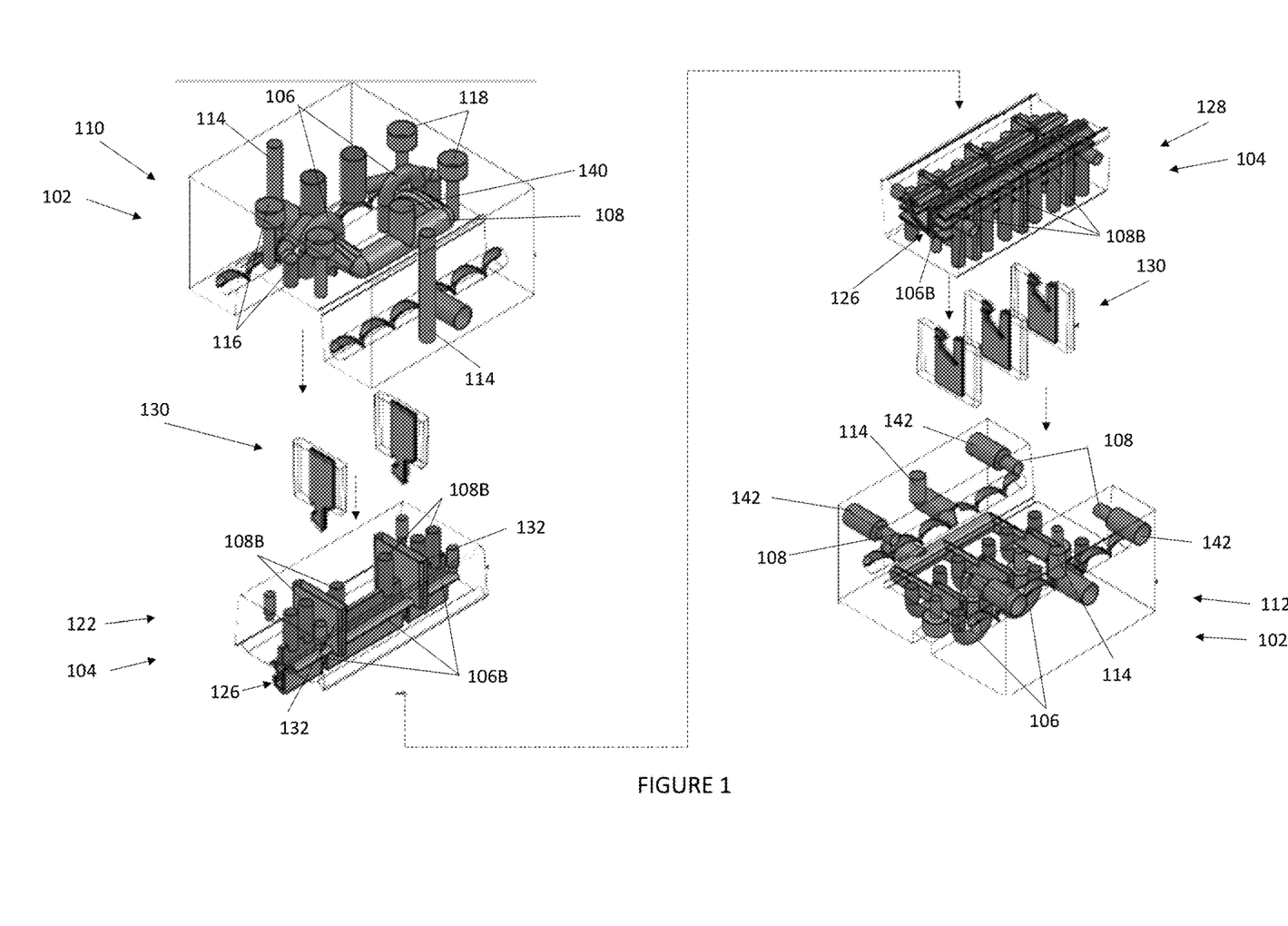
FIG. 1 illustrates an exploded view of an exemplary embodiment of the sizer.
Figure 2:
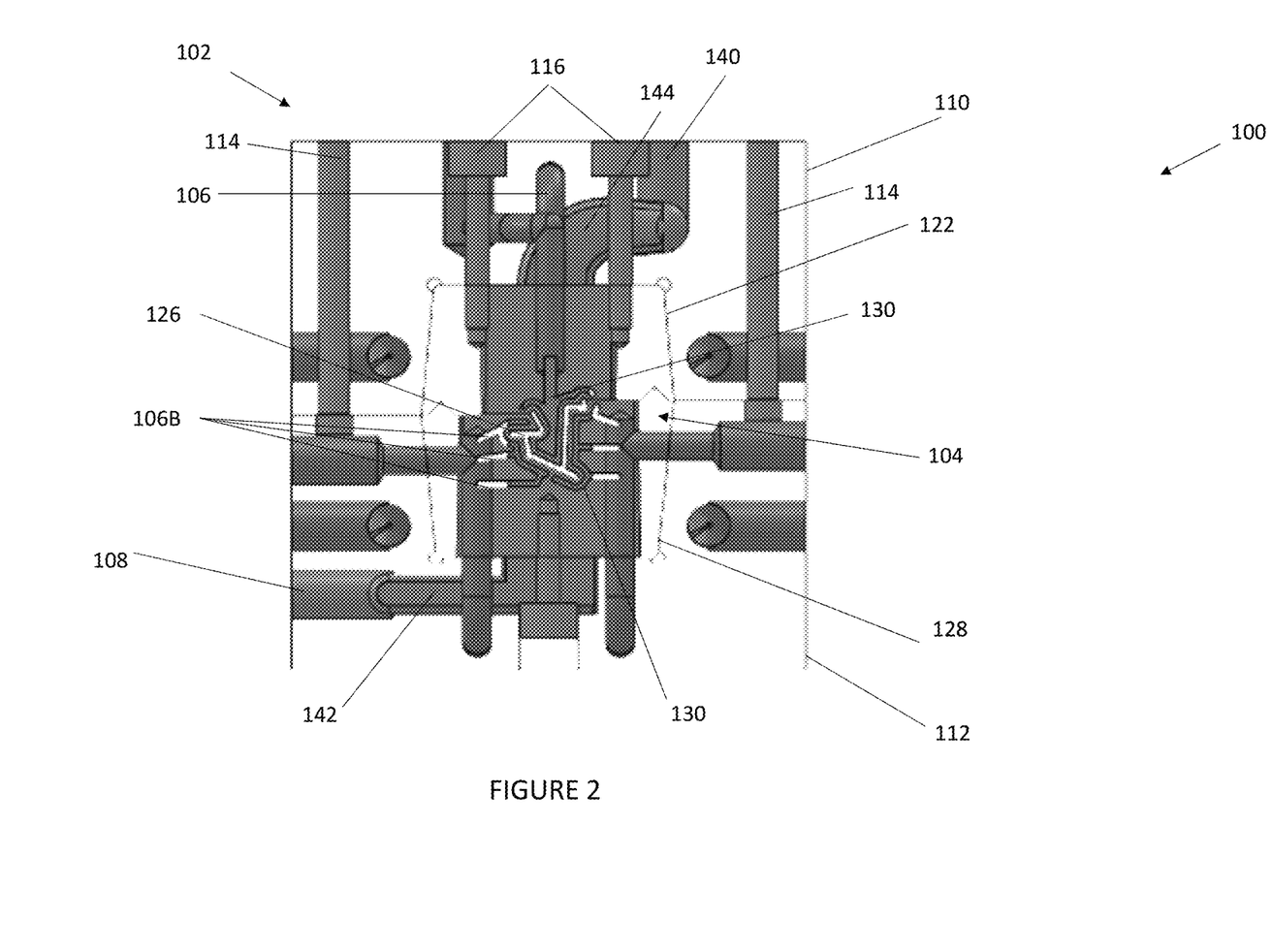
FIG. 2 illustrates a cross sectional view of the sizer of FIG. 1 in an assembled state.
Figure 3:
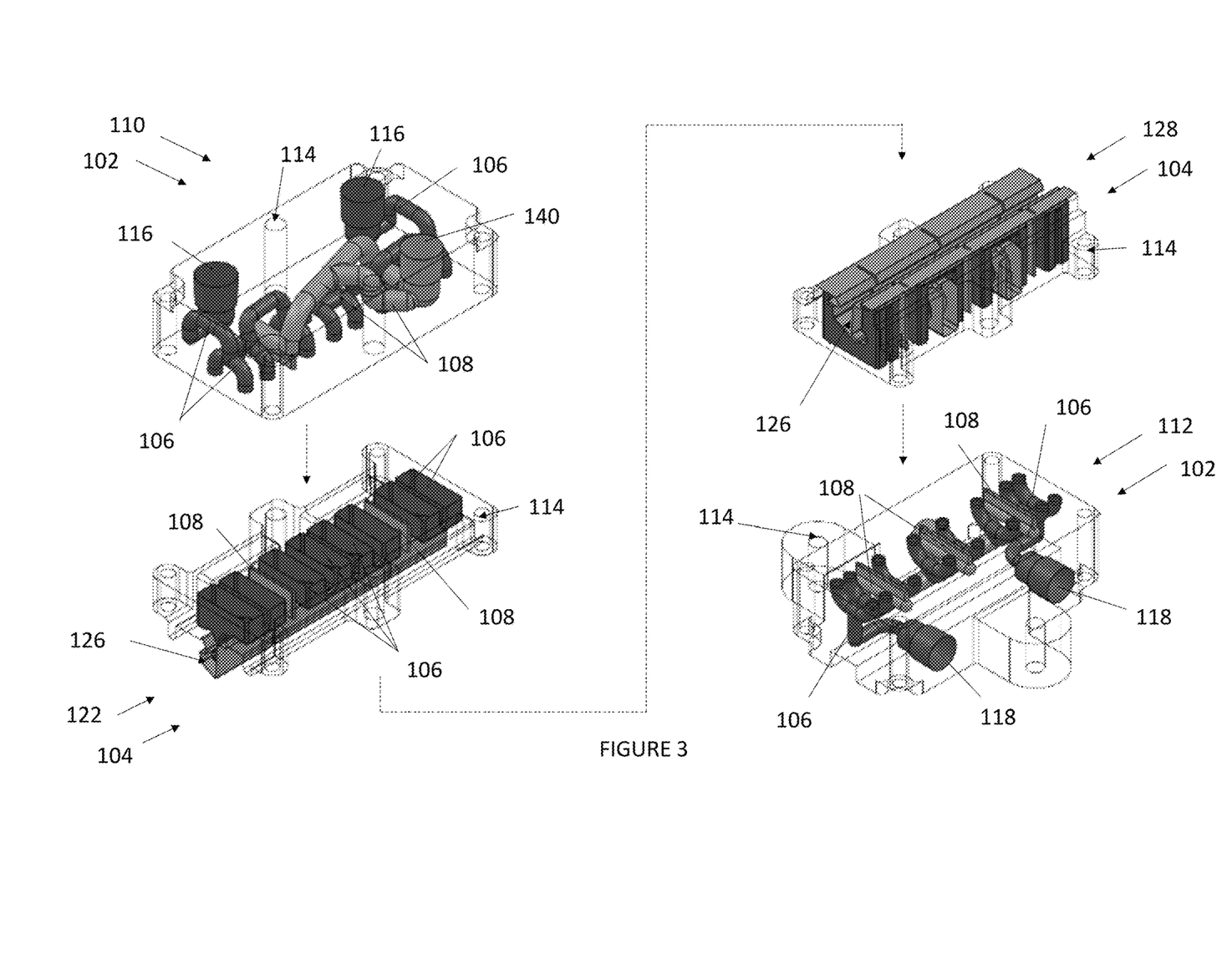
FIG. 3 is an exploded view of another exemplary sizer.
Figure 4:
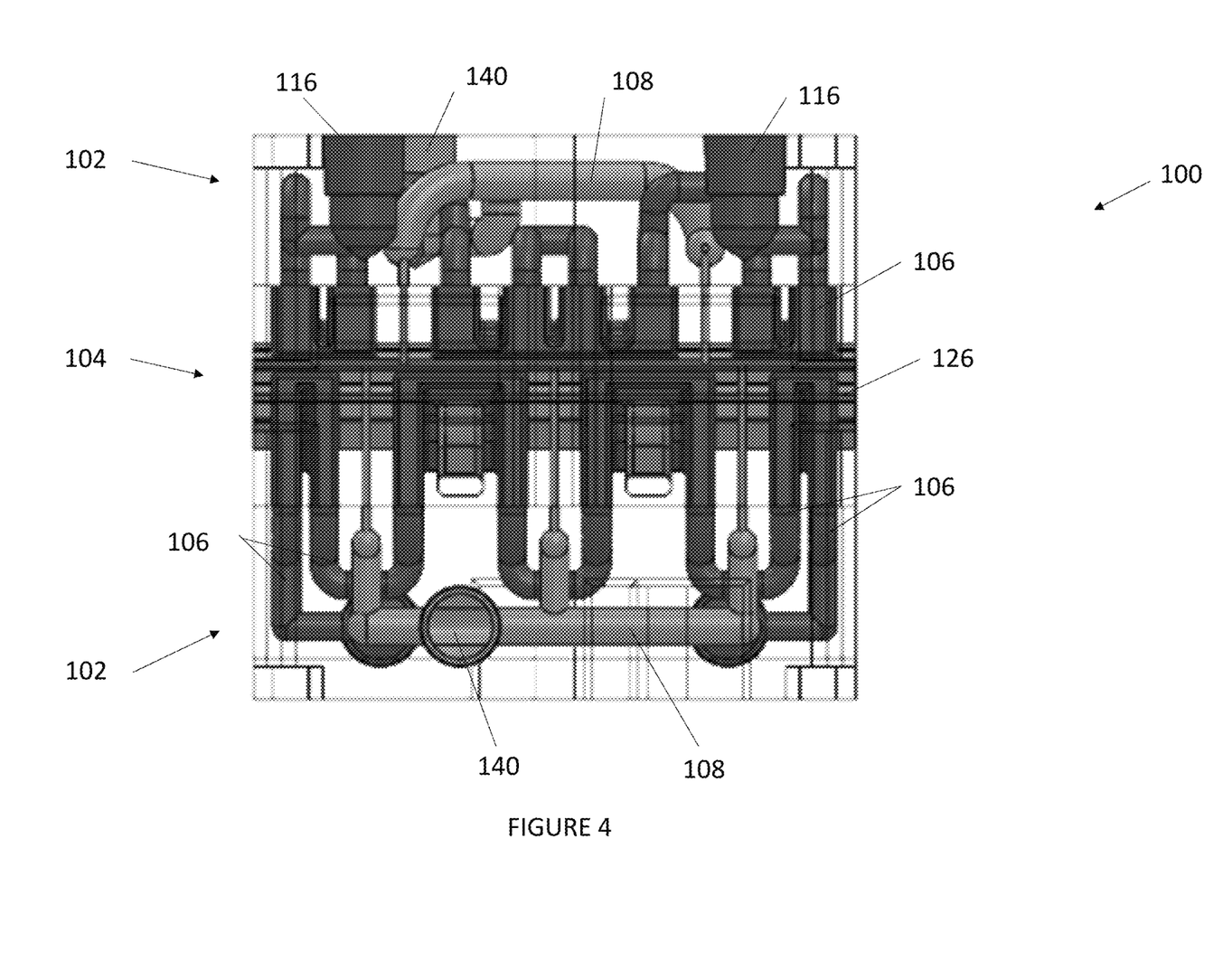
FIG. 4 is a side view of the sizer of FIG. 3 in an assembled state.

FIG. 1 and FIG. 2 illustrate an exemplary sizer 100. The sizer 100 may comprise a housing 102 and a core 104. The core 104 may comprise an extrusion channel 126. The extrusion channel 126 may be configured to accommodate the extrudate. The housing 102 may comprise an upper portion 110 and a lower portion 112. The housing 102 may comprise any number of pieces. For example, without limitation, the housing 102 may be formed by joining multiple pieces, at least some of which fit into the side of the sizer 100 as inserts. The upper portion 110 and the lower portion 112 may be separately formed, though such is not required. In exemplary embodiments, the housing 102 may be created through additive manufacturing techniques, such as but not limited to 3-D printing. The housing 102 may be comprised of a polymer, metal, composite, or other material.

The housing 102 may comprise one or more cooling channels 106. In exemplary embodiments, one or more of the cooling channels 106 comprise one or more non-linear segments. Such non-linear segments may include, for example without limitation, curves, corkscrews, rounded bends, U-shaped turns, sinuous passageways, S-curves, some combination thereof, or the like. The cooling channels 106 may be configured to extend in proximity to the extrusion channel 126. In exemplary embodiments, the cooling channels 106 may extend along some or all of the extrusion channel 126. The cooling channels 106 may be configured to increase or reduce turbulence as required to provide adequate cooling. For example, without limitation, curves, corkscrews, rounded bends, U-shaped turns, sinuous passageways, S-curves, some combination thereof, or the like may be provided to induce turbulence. Alternatively, or additionally, smooth turns and relatively straight passageways may be provided to reduce turbulence and increase flow rate.

The housing 102 may comprise one or more vacuum channels 108. In exemplary embodiments, the vacuum channels 108 may comprise one or more non-linear segments. Such non-linear segments may comprise, for example without limitation, curves, corkscrews, rounded bends, U-shaped turns, sinuous passageways, S-curves, some combination thereof, or the like. The cooling channels 106 and/or the vacuum channels 108 may be configured to avoid one another. The cooling channels 106 and/or the vacuum channels 108 may not intersect one another. In exemplary embodiments, such cooling channels 106 and vacuum channels 108 are provided in both the upper portion 110 and lower portion 112 of the housing, though such is not required.

One or more alignment devices 114 may be provided in the housing 102. In exemplary embodiments, one or more alignment channels are provided in the upper portion 110 of the housing 102 and one or more corresponding alignment protrusions are provided in the lower portion 112 of the housing 102, though the reverse is contemplated. The alignment protrusions may be configured to be mated with the alignment channels. In other embodiments, the alignment devices 114 may comprise channels and a rod, clamp, fastener or other device may be inserted through the alignment channels.

One or more cooling inlets 116 may be provided in the housing 102. One or more cooling outlets 118 may be provided in the housing 102. It is contemplated that such cooling inlets 116 and/or outlets 118 may be provided in the upper portion 110 and/or the lower portion 112. One or more vacuum inlets 140 may be provided in the housing 102 of the housing 102. It is contemplated that such vacuum inlets 140 may be provided in the upper portion 110 and/or the lower portion 112 of the housing 102. In other exemplary embodiments, the cooling channels 106 and/or the vacuum channels 108 may be configured to interact with the cooling channels 106 and/or the vacuum channels 108 of an adjacent sizer 102, in such cases, the cooling inlets 116 and outlets 118 and/or the vacuum inlets 140 may not be required. The cooling inlets 116 and outlets 118 and/or the vacuum inlets 140 may be provided in an outer surface of the housing 102. The cooling inlets 116 and outlets 118 may be placed in fluid communication with the cooling channels 106. The vacuum inlets 140 may be placed in fluid communication with the vacuum channels 108.

The cooling channels 106 may be configured to accommodate a coolant, such as but not limited to water. The cooling channels 106 may be configured to provide conductive thermal heat transfer between the relatively warm extrudate in the extrusion channel 126 and the coolant in the cooling channels 106. The cooling inlet(s) 116 may be placed in fluid communication with a reservoir, pump, tubing, piping, some combination thereof, or the like which transports coolant to the cooling inlet(s) 116 for passage through the cooling channels 106 and to the cooling outlet(s) 118 to exit the sizer 100. The cooling outlet(s) 118 may be placed in fluid communication with a container, drain, pump, tubing, piping, some combination thereof, or the like for removing the coolant from the sizer 100.

The vacuum channels 108 may be in fluid communication with the extrusion channel 126. The vacuum channels 108 may be configured to facilitate the transmission of suction forces to the extrudate located in the extrusion channel 126. The vacuum channels 108 may be configured to provide suction forces which provide desirable distribution of extrudate material within the extrusion channel 126. The vacuum inlet(s) 140 may be placed in fluid communication with a pump, tubing, piping, some combination thereof, or the like which transports suctional forces to the extrusion channel 126.

The housing 102 may be configured to accommodate a core 104. The core 104 may be comprised of a metal such as, but not limited to, steel, aluminum, stainless steel, another thermally conductive material, or some combination thereof. In other exemplary embodiments, the core 104 may be comprised of a non-metallic, thermally conductive material such as a polymer, composite, or the like. In some exemplary embodiments, such as those shown in FIG. 1 and FIG. 2, the core 104 may be created using subtractive manufacturing techniques such as, but not limited to, drilling, wire EDM, some combination thereof, or the like. In such cases, at least portions of the cooling channels 106 in the core 104 may comprise one or more linear cooling segments 106B. Preferably, the linear cooling segments 106B extend along some or all of the extrusion channel 126. The vacuum channels 108 in the core 104 may comprise one or more linear cooling channels 108B. The linear vacuum channels 108B may extend through some or all of the core 104. In some exemplary embodiments, all of the cooling channels 106 in the core 104 may comprise linear cooling segments 106B and all of the vacuum channels 108 in the core 104 may comprise linear vacuum segments 108B.

One or more gaps 132 may be formed into the core 104 to accommodate subtractive manufacturing of the cooling channels 106 and/or the vacuum channels 108. One or more inserts 130 may be provided for placement in the gaps 132 to block passage of coolant or suction therebeyond. Such gaps 132 may be provided to facilitate subtractive manufacturing of the cooling channels 106 and/or the vacuum channels 108, such as by driller. Such gaps 132 may be portions of the cooling channels 106 and/or the vacuum channels 108 which are subsequently blocked or plugged.

The core 104 may comprise an upper portion 122 and a lower portion 128. The core 104 may comprise any number of pieces. For example, without limitation, the core 104 may be formed by joining multiple pieces, at least some of which fit into the side of the sizer 100 as inserts. The upper portion 122 and lower portion 128 of the core 104 may be configured to fit together. When joined, the upper portion 122 and the lower portion 128 may form the extrusion channel 126, the linear cooling channels 106B, and the linear vacuum channels 108B.

The upper portion 110 and the lower portion 112 of the housing 102 may be configured to fit together. When joined, the upper portion 110 and the lower portion 112 may form the cooling channels 106 and the vacuum channels 108.

Referring to FIG. 3 through FIG. 5C, other exemplary embodiments of the sizer 100 are depicted. In such embodiments, the core 104, alternatively or in addition to the housing 102, may comprise non-linear cooling channels 106. The core 104, alternatively or in addition to the housing 102, may comprise non-linear vacuum channels 108. The core 104 may be made by additive manufacturing, such as but not limited to, 3-D printing. Such embodiments may eliminate the need for gaps 132 and inserts 130, though such is not required.

Figures 5A, 5B, 5C:
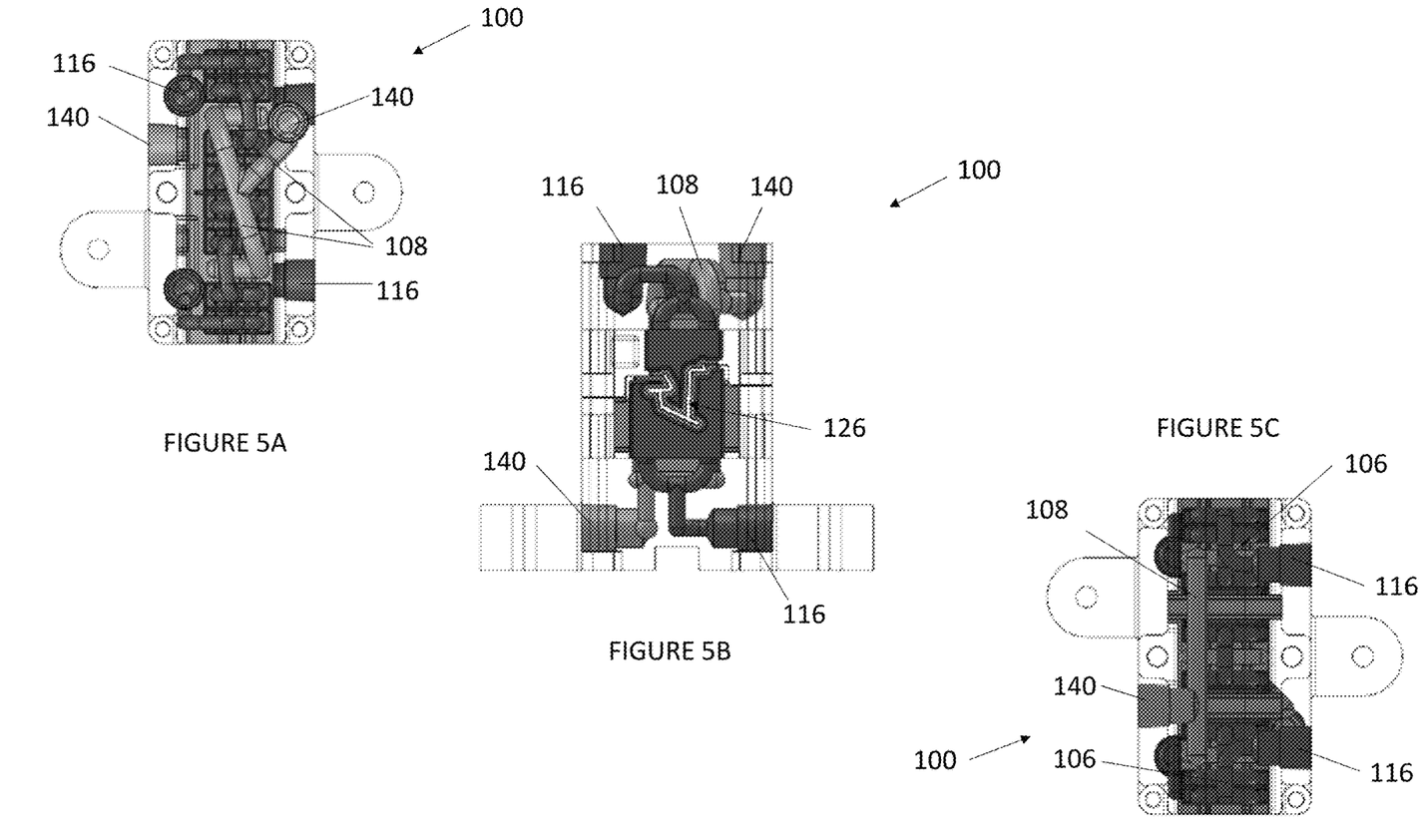
FIG. 5A is a top view of the assembled sizer of FIG. 4.
FIG. 5B is a front view of the assembled sizer of FIG. 4.
FIG. 5C is a bottom view of the assembled sizer of FIG. 4.

As shown particularly with regard to FIG. 2 and FIG. 5B, the cooling channels 106 in the core 104 may closely conform to the shape of the extrusion channel 126. The vacuum channels 108 may closely confirm to the shape of the extrusion channel 126. For example, without limitation, the cooling channels 106 and the vacuum, channels 108 may be located between $\frac{1}{1,000}$th inch to 2 inches of the extrusion channel 126.

Figure 6:
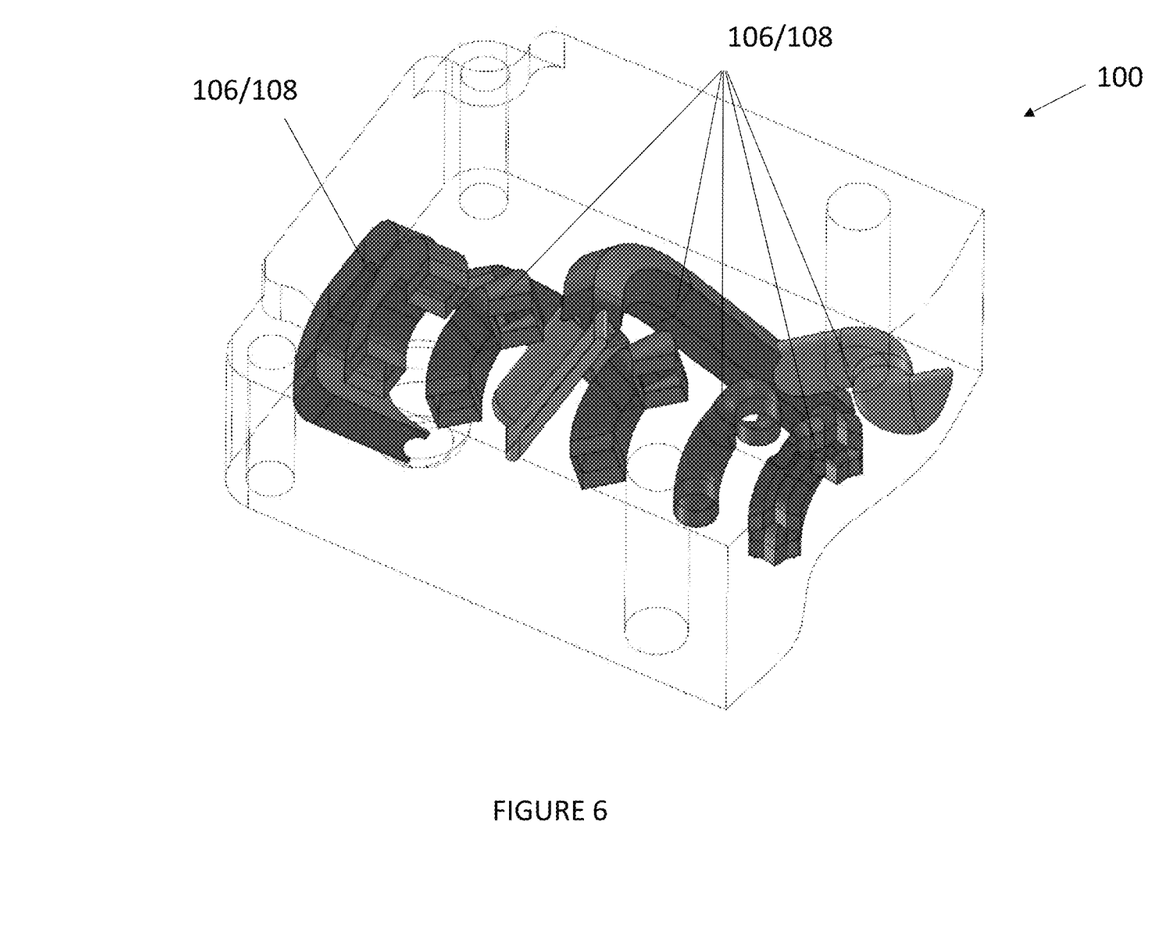
FIG. 6 is a perspective view of a top portion of an exemplary sizer with certain components illustrated in a hidden state to illustrate certain interior components of the sizer.

As shown particularly in FIG. 6, the cooling channels 106 and/or the vacuum channels 108 may be provided with various geometric cross sections, such as but not limited to, circles, squares, stars, ovals, rectangles, some combination thereof, or the like. While FIG. 6 is illustrated with respect to the upper portion 110 of the housing 102, it is contemplated that such various geometric cross sections may be utilized with any portion of the housing 102 and/or the core 104.

The design, shape, and placement of cooling channels 106 and vacuum channels 108 as well as the cooling inlets 116, cooling outlets 118, and vacuum inlets 140 are each exemplary and are not intended to be limiting. Any design, shape, and placement of such cooling channels 106, vacuum channels 108, cooling inlets 116, cooling outlets 118, and vacuum inlets 140 are contemplated.

In exemplary embodiments, the alignment device 114 may comprise a number of threaded and/or non-threaded holes and fasteners. The holes may be provided on the upper portion 110 and/or lower portion 112 of the housing 102 as well as the upper portion 122 and/or lower portion 128 of the core 104. The holes may be configured to accommodate one or more fasteners for securing such parts to one another. After forming the housing 102 and/or the core 104 by additive manufacturing, wire EDM or another subtractive manufacturing technique may be utilized to provide a finished surface. While discussed with respect to cooling channels 106 and vacuum channels 108, it is contemplated that channels for other purposes may be so utilized. One or more handles may be provided on the upper portion 110 and/or lower portion 112 of the housing 102 as well as the upper portion 122 and/or lower portion 128 of the core 104. Various portions of the upper portion 110 and/or lower portion 112 of the housing 102 as well as the upper portion 122 and/or lower portion 128 of the core 104 may be removed to reduce weight.

The profile of the illustrated extrusion channel 126 is merely exemplary and is not intended to be limiting. Any size, shape, or configuration of the extrusion channel 126 to create any size, shape, or configuration extrudate is contemplated.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A sizer for cooling an extrudate comprising:
   a core comprising:
      an extrusion channel configured to accommodate the extrudate;
      a core cooling channel; and
      a core vacuum channel in fluid communication with said extrusion channel;
      wherein said core is comprised of a metal;
   a housing for housing said core comprising:
      a housing cooling channel;
      a housing vacuum channel;
      a cooling intake located at a first end of said housing cooling channel;
      a cooling exhaust located at a second end of said housing cooling channel; and
      a vacuum intake located at a first end of said housing vacuum channel;
      wherein said housing is comprised of a polymer;
   a cooling pathway for the circulation of a coolant through the sizer, said cooling pathway comprising said cooling intake, said cooling exhaust, said housing cooling channel, and said core cooling channel; and
   a vacuum pathway for the transmission of suction forces to the extrudate, said vacuum pathway comprising said vacuum intake, said housing vacuum channel, said core vacuum channel, and said extrusion channel.

2. The sizer of claim 1 wherein:
   the core cooling channel is a conformal channel configured to closely conform to the shape of the extrusion channel.

3. The sizer of claim 2 wherein:
   said core cooling channel extends between 1/100th and 2 inches from the extrusion channel.

4. The sizer of claim 2 wherein:
   said core comprises an upper core portion and a lower core portion; and
   said upper core portion and said lower core portion are separately formed.

5. The sizer of claim 3 wherein:
   said housing comprises an upper housing portion and a lower housing portion; and
   said upper housing portion and said lower housing portion are separately formed.

6. The sizer of claim 5 wherein:
   the core cooling channel comprises at least one curved segment.

7. The sizer of claim 6 wherein:
   the housing cooling channel or the core cooling channel comprises a non-circular cross section.

8. The sizer of claim 1 wherein:
   said metal is a thermally conductive material; and
   said polymer is a thermally conductive material or a non-thermally conductive material.

9. The sizer of claim 8 wherein:
   said metal is stainless steel.

10. The sizer of claim 8 wherein:
    the core has been created by additive manufacturing; and
    the housing has been created by additive manufacturing.

11. The sizer of claim 10 further comprising:
    an alignment device provided in each of the core and the housing.

12. The sizer of claim 11 wherein:
    the alignment device comprises a number of threaded holes configured to accommodate fasteners.

13. The sizer of claim 1 wherein:
    said housing cooling channel comprises at least one curved segment; and
    said housing vacuum channel comprises at least one curved segment.

14. The sizer of claim 1 wherein:
    said core cooling channel comprises at least one curved segment; and
    said core vacuum channel comprises at least one curved segment.

15. A sizer for cooling an extrudate created by a method comprising the steps of:
    creating, from a thermally conductive metal, a core comprising an upper core portion and a lower core portion, each of the upper core portion and the lower core portion comprising:
       an extrusion channel configured to accommodate the extrudate;
       a core cooling channel configured to closely conform to the shape of the extrusion channel along at least a portion thereof; and
       a core vacuum channel in fluid communication with said extrusion channel;
    creating, from a polymer, a housing for housing said core comprising an upper housing portion and a lower housing portion, each of the upper housing portion and the lower housing portion comprising:
       a housing cooling channel having at least one curved segment;
       a housing vacuum channel having at least one curved segment;
       a cooling intake in fluid communication with said housing cooling channel;
       a cooling exhaust in fluid communication with said housing cooling channel; and
       a vacuum intake; and
    joining the upper housing portion to the upper core portion, the upper core portion to the lower core portion, and the lower core portion to the lower housing portion to form:
       a continuous cooling pathway for the circulation of a coolant through the sizer comprising said cooling intake, said cooling exhaust, said housing cooling channel, and said core cooling channel; and a continuous vacuum pathway for the suction of the extrudate comprising said vacuum intake, said housing vacuum channel, said core vacuum channel, and said extrusion channel;

wherein said upper portion and said lower portion of said core are separately formed; and wherein said upper portion and said lower portion of said housing are separately formed.

16. The sizer of claim 15 wherein:
said core is created by subtractive manufacturing techniques; and
said housing is created by additive manufacturing techniques.

17. The sizer of claim 16 wherein:
said subtractive manufacturing techniques comprise electrical discharge machining; and
said additive manufacturing techniques comprise 3-D printing.

18. The sizer of claim 16 wherein:
a portion of said housing is subsequently created by subtractive manufacturing techniques.

19. The sizer of claim 15 wherein:
said core and said housing are created by 3-D printing.

20. The sizer of claim 19 wherein:
said core cooling channel comprises at least one curved segment; and
said core vacuum channel comprises at least one curved segment.

21. The sizer of claim 19 wherein:
a portion of said housing is subsequently created by subtractive manufacturing techniques.

22. The sizer of claim 19 wherein:
a portion of said core is subsequently created by subtractive manufacturing techniques.

23. A sizer for cooling an extrudate comprising:
a core comprising an upper core half and a lower core half, each of said upper core half and said lower core half comprising:
an extrusion channel configured to accommodate the extrudate;
a core cooling channel having at least one curved segment; and
a core vacuum channel in fluid communication with said extrusion channel, wherein said core vacuum channel has at least one curved segment;
wherein said core is comprised of stainless steel;
a housing for housing said core comprising an upper housing half and a lower housing half, each of said upper housing half and said lower housing half comprising:
a housing cooling channel having at least one curved segment;
a housing vacuum channel having at least one curved segment;
a cooling intake in fluid communication with said housing cooling channel;
a cooling exhaust in fluid communication with said housing cooling channel; and
a vacuum intake;
wherein said housing is comprised of a polymer;
a continuous cooling pathway for the circulation of a coolant through the sizer comprising said cooling intake, said cooling exhaust, said housing cooling channel, and said core cooling channel; and
a vacuum pathway for the suction of the extrudate comprising said vacuum intake, said housing vacuum channel, said core vacuum channel, and said extrusion channel.

* * * * *